US009674554B2

(12) United States Patent
Eslami (10) Patent No.: US 9,674,554 B2
(45) Date of Patent: Jun. 6, 2017

(54) IMAGE PROCESSING SYSTEM WITH CODING MODE AND METHOD OF OPERATION THEREOF

(71) Applicant: Sony Corporation, Tokyo (JP)

(72) Inventor: Ramin Eslami, Milpitas, CA (US)

(73) Assignee: Sony Corporation, Tokyo (JP)

( * ) Notice: Subject to any disclaimer, the term of this patent is extended or adjusted under 35 U.S.C. 154(b) by 281 days.

(21) Appl. No.: 14/525,556

(22) Filed: Oct. 28, 2014

(65) Prior Publication Data

US 2016/0119629 A1   Apr. 28, 2016

(51) Int. Cl.
| | |
|---|---|
| *H04N 7/12* | (2006.01) |
| *H04N 11/02* | (2006.01) |
| *H04N 11/04* | (2006.01) |
| *H04N 19/645* | (2014.01) |
| *H04N 19/13* | (2014.01) |

(52) U.S. Cl.
CPC .......... *H04N 19/645* (2014.11); *H04N 19/13* (2014.11)

(58) Field of Classification Search
None
See application file for complete search history.

(56) References Cited

U.S. PATENT DOCUMENTS

| | | | |
|---|---|---|---|
| 6,154,493 | A | 11/2000 | Acharya et al. |
| 6,272,180 | B1 | 8/2001 | Lei |
| 6,356,665 | B1 | 3/2002 | Lei et al. |
| 6,546,143 | B1 | 4/2003 | Taubman et al. |
| 6,549,666 | B1 | 4/2003 | Schwartz |
| 6,801,665 | B1 | 10/2004 | Atsumi et al. |
| 6,865,291 | B1 | 3/2005 | Zador |
| 6,965,700 | B2 | 11/2005 | Pearlman et al. |
| 7,006,247 | B1 * | 2/2006 | Sekine ..................... H04N 1/46 358/1.9 |
| 7,006,697 | B1 | 2/2006 | Gormish et al. |
| 7,120,307 | B2 | 10/2006 | Malvar |

(Continued)

FOREIGN PATENT DOCUMENTS

WO    WO-0049571 A2    8/2000

OTHER PUBLICATIONS

U.S. Appl. No. 14/525,364, filed Oct. 28, 2014, Eslami.

(Continued)

*Primary Examiner* — Sath V Perungavoor
*Assistant Examiner* — Xiaolan Xu
(74) *Attorney, Agent, or Firm* — Haverstock & Owens LLP (57) ABSTRACT

An image processing system, and a method of operation thereof, including: a capture device for obtaining an input image block; and an image signal processing hardware coupled to the capture device, the image signal processing hardware including: a coding module including: a scaling correction module for generating a scaled wavelet block based on the input image block, a grey block detection module for determining the input image block to be a grey image block, a compression ratio module for determining the compression ratio of the input image block, a mode setting module for setting a PCM mode identifier based on the compression ratio, the coding module for generating a compressed image block by scanning and coding the input image block using PCM mode; and a decoding module for generating an output image block by decoding the compressed image block for display on a display device.

10 Claims, 8 Drawing Sheets

(56) References Cited

U.S. PATENT DOCUMENTS

| | | |
|---|---|---|
| 7,142,722 B2 | 11/2006 | Fukuhara et al. |
| 7,248,735 B2 | 7/2007 | Funakubo |
| 7,308,402 B2 | 12/2007 | Zhou et al. |
| 7,315,651 B2 | 1/2008 | Sakuyama et al. |
| 7,376,279 B2 | 5/2008 | Dekel et al. |
| 7,397,963 B2 | 7/2008 | Schwartz |
| 7,412,102 B2 | 8/2008 | Srinivasan et al. |
| 7,421,137 B2 | 9/2008 | Taubman |
| 7,454,074 B2 | 11/2008 | Dekel et al. |
| 7,492,955 B2 | 2/2009 | Zandi et al. |
| 7,545,988 B2 | 6/2009 | Meeker |
| 7,574,056 B2 | 8/2009 | Funakubo et al. |
| 7,623,577 B2 | 11/2009 | Kim et al. |
| 7,634,145 B2 | 12/2009 | Keith et al. |
| 7,656,561 B2 | 2/2010 | Molgaard et al. |
| 7,949,044 B2 | 5/2011 | Winger et al. |
| 8,265,334 B2 | 9/2012 | Yoo et al. |
| 8,306,340 B2 | 11/2012 | Ceperkovic et al. |
| 8,351,693 B2 | 1/2013 | Hayashi |
| 8,401,082 B2 | 3/2013 | Ye et al. |
| 8,428,379 B2 | 4/2013 | Rane et al. |
| 8,446,947 B2 | 5/2013 | Yu et al. |
| 8,588,536 B2 | 11/2013 | Dikbas et al. |
| 8,861,879 B2 | 10/2014 | Park et al. |
| 2001/0024530 A1 | 9/2001 | Fukuhara et al. |
| 2002/0003905 A1 | 1/2002 | Sato et al. |
| 2002/0118759 A1 | 8/2002 | Enficiaud et al. |
| 2003/0063809 A1 | 4/2003 | Andrew |
| 2003/0123742 A1 | 7/2003 | Zhao et al. |
| 2003/0190042 A1 | 10/2003 | Tagashira et al. |
| 2005/0131660 A1 | 6/2005 | Yadegar et al. |
| 2005/0175251 A1* | 8/2005 | Taketa ............... H04N 19/647 382/248 |
| 2006/0034525 A1 | 2/2006 | Sakai |
| 2006/0159355 A1 | 7/2006 | Mizuno |
| 2008/0253463 A1 | 10/2008 | Lin et al. |
| 2010/0046628 A1 | 2/2010 | Bhaskaran et al. |
| 2010/0085224 A1 | 4/2010 | Monro |
| 2011/0229047 A1 | 9/2011 | Shimauchi et al. |
| 2011/0292247 A1 | 12/2011 | Gharavi-Alkhansari et al. |
| 2012/0200669 A1 | 8/2012 | Lai et al. |
| 2012/0307904 A1 | 12/2012 | Yi et al. |
| 2014/0169693 A1 | 6/2014 | Kuo et al. |
| 2016/0055618 A1* | 2/2016 | Karpenko ............. G06F 3/1454 345/619 |

OTHER PUBLICATIONS

U.S. Appl. No. 14/525,474, filed Oct. 28, 2014, Eslami.
U.S. Appl. No. 14/525,524, filed Oct. 28, 2014, Eslami.
U.S. Appl. No. 14/525,611, filed Oct. 28, 2014, Eslami.
U.S. Appl. No. 14/525,657, filed Oct. 28, 2014, Eslami.
U.S. Appl. No. 14/526,120, filed Oct. 28, 2014, Eslami.
Pearlman et al., Efficient, Low-Complexity Image Coding with a Set-Partitioning Embedded Block Coder, IEEE Transactions on Circuits and Systems for Video Technology, Nov. 2004, pp. 1219-1235, vol. 14, No. 11, IEEE.

* cited by examiner

| y | index | n=6 | n=5 | n=4 | n=3 | n=2 | n=1 | group |
|---|---|---|---|---|---|---|---|---|
| 37 | 1 | 1 | 0 | 0 | 1 | 0 | 1 | L3 |
| 40 | 2 | 1 | 0 | 1 | 0 | 0 | 0 | L3 |
| 44 | 3 | 1 | 0 | 1 | 1 | 0 | 0 | L3 |
| 16 | 4 | 0 | 1 | 0 | 0 | 0 | 0 | H3 |
| -1 | 5 | 0 | 0 | 0 | 0 | 0 | 1 | H3 |
| -2 | 6 | 0 | 0 | 0 | 0 | 1 | 0 | H3 |
| 12 | 7 | 0 | 0 | 1 | 1 | 0 | 0 | H3 |
| -15 | 8 | 0 | 0 | 1 | 1 | 1 | 1 | H3 |
| 1 | 9 | 0 | 0 | 0 | 0 | 0 | 1 | H2 |
| 2 | 10 | 0 | 0 | 0 | 0 | 1 | 0 | H2 |
| -1 | 11 | 0 | 0 | 0 | 0 | 0 | 1 | H2 |
| 0 | 12 | 0 | 0 | 0 | 0 | 0 | 0 | H2 |
| 2 | 13 | 0 | 0 | 0 | 0 | 1 | 0 | H2 |
| 6 | 14 | 0 | 0 | 0 | 1 | 1 | 0 | H2 |
| -4 | 15 | 0 | 0 | 0 | 1 | 0 | 0 | H2 |
| -2 | 16 | 0 | 0 | 0 | 0 | 1 | 0 | H2 |
| 0 | 17 | 0 | 0 | 0 | 0 | 0 | 0 | H1 |
| 0 | 18 | 0 | 0 | 0 | 0 | 0 | 0 | H1 |
| 0 | 19 | 0 | 0 | 0 | 0 | 0 | 0 | H1 |
| 1 | 20 | 0 | 0 | 0 | 0 | 0 | 1 | H1 |
| 0 | 21 | 0 | 0 | 0 | 0 | 0 | 0 | H1 |
| -1 | 22 | 0 | 0 | 0 | 0 | 0 | 1 | H1 |
| 1 | 23 | 0 | 0 | 0 | 0 | 0 | 1 | H1 |
| 0 | 24 | 0 | 0 | 0 | 0 | 0 | 0 | H1 |
| 0 | 25 | 0 | 0 | 0 | 0 | 0 | 0 | H1 |
| 1 | 26 | 0 | 0 | 0 | 0 | 0 | 1 | H1 |
| 1 | 27 | 0 | 0 | 0 | 0 | 0 | 1 | H1 |
| 1 | 28 | 0 | 0 | 0 | 0 | 0 | 1 | H1 |
| -2 | 29 | 0 | 0 | 0 | 0 | 1 | 0 | H1 |
| 0 | 30 | 0 | 0 | 0 | 0 | 0 | 0 | H1 |
| 0 | 31 | 0 | 0 | 0 | 0 | 0 | 0 | H1 |
| 0 | 32 | 0 | 0 | 0 | 0 | 0 | 0 | H1 |

IMAGE PROCESSING SYSTEM WITH CODING MODE AND METHOD OF OPERATION THEREOF

CROSS-REFERENCE TO RELATED APPLICATION(S)

The present application contains subject matter related to a concurrently filed U.S. patent application by Ramin Eslami entitled "IMAGE PROCESSING SYSTEM WITH BITSTREAM REDUCTION AND METHOD OF OPERATION THEREOF". The related application is assigned to Sony Corporation and is identified as U.S. patent application Ser. No. 14/525,364, filed Oct. 28, 2014 (now U.S. Pat. No. 9,357,237). The subject matter thereof is incorporated herein by reference thereto.

The present application contains subject matter related to a concurrently filed U.S. patent application by Ramin Eslami entitled "IMAGE PROCESSING SYSTEM WITH BINARY DECOMPOSITION AND METHOD OF OPERATION THEREOF". The related application is assigned to Sony Corporation and is identified as U.S. patent application Ser. No. 14/525,474, filed Oct. 28, 2014 (now U.S. Pat. No. 9,357,232). The subject matter thereof is incorporated herein by reference thereto.

The present application contains subject matter related to a concurrently filed U.S. patent application by Ramin Eslami entitled "IMAGE PROCESSING SYSTEM WITH ARTIFACT REDUCTION MECHANISM AND METHOD OF OPERATION THEREOF". The related application is assigned to Sony Corporation and is identified as U.S. patent application Ser. No. 14/525,524, filed Oct. 28, 2014 (now U.S. Pat. No. 9,294,782). The subject matter thereof is incorporated herein by reference thereto.

The present application contains subject matter related to a concurrently filed U.S. patent application by Ramin Eslami entitled "IMAGE PROCESSING SYSTEM WITH CONDITIONAL CODING AND METHOD OF OPERATION THEREOF". The related application is assigned to Sony Corporation and is identified as U.S. patent application Ser. No. 14/526,611, filed Oct. 28, 2014. The subject matter thereof is incorporated herein by reference thereto.

The present application contains subject matter related to a concurrently filed U.S. patent application by Ramin Eslami entitled "IMAGE PROCESSING SYSTEM WITH BINARY ADAPTIVE GOLOMB CODING AND METHOD OF OPERATION THEREOF". The related application is assigned to Sony Corporation and is identified as U.S. patent application Ser. No. 14/525,657, filed Oct. 28, 2014 (now U.S. Pat. No. 9,591,330). The subject matter thereof is incorporated herein by reference thereto.

The present application contains subject matter related to a concurrently filed U.S. patent application by Ramin Eslami entitled "IMAGE PROCESSING SYSTEM WITH JOINT ENCODING AND METHOD OF OPERATION THEREOF". The related application is assigned to Sony Corporation and is identified as U.S. patent application Ser. No. 14/526,120, filed Oct. 28, 2014. The subject matter thereof is incorporated herein by reference thereto.

TECHNICAL FIELD

The embodiments of the present invention relate generally to an image processing system, and more particularly to a system for coding grey image blocks.

BACKGROUND ART

Existing data networks experience ever-increasing demands on them due to the proliferation of embedded, mobile, and otherwise internet-connected devices. The rapid increase of mobile devices has also placed great demands on wireless data networks. A large part of this increased demand is due to streaming audio or video.

Streaming video places heavy demands on available bandwidth due to the high volume of data required. Thus, compression of video or audio data becomes necessary. Many different data compression codecs (coder-decoder) for audio and video exist, with various levels of efficiency. However, not all codecs are equally efficient, and as wireless networks get more congested, and data usage caps become more common, continuous improvement in compression ratios, especially for streaming and on-demand video, is desired.

Thus, a need still remains for a better encoding method. In view of the rapid rise in the consumption of on-demand video, it is increasingly critical that answers be found to these problems. Growing consumer expectations and diminishing opportunities for meaningful product differentiation in the marketplace make it critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The embodiments of the present invention provide a method of operation of an image processing system, including: obtaining an input image block with a capture device; generating a transformed image block based on the input image block, the transformed image block having wavelet coefficients where the binary values of the wavelet coefficients are organized into bitplanes each with a bitplane priority value; generating a scaled wavelet block by increasing the bitplane priority value for selected subbands of the bitplanes of the wavelet coefficients with a scaling factor; determining the input image block to be a grey image block; determining wavelet coding of the scaled wavelet block to result in lossy compression; determining the compression ratio of the input image block; setting a PCM mode identifier based on the compression ratio of the input image block meeting or exceeding a compression ratio threshold; generating a compressed image block by scanning and coding the bitplanes of the input image block using PCM mode; and generating an output image block by decoding the compressed image block for display on a display device.

The embodiments of the present invention provide an image processing system, including: a capture device for obtaining an input image block; and an image signal processing hardware coupled to the capture device, the image signal processing hardware including: a wavelet transform module for generating a transformed image block based on the input image block, the transformed image block having wavelet coefficients where the binary values of the wavelet coefficients are organized into bitplanes each with a bitplane priority value, a coding module coupled to the wavelet transform module including: a scaling correction module for generating a scaled wavelet block by increasing the bitplane priority value for selected subbands of the bitplanes of the wavelet coefficients with a scaling factor, a grey block detection module within a mode determination module for determining the input image block to be a grey image block, a lossless wavelet coding check module for determining wavelet coding of the scaled wavelet block to result in lossy compression, a compression ratio module within the mode determination module and coupled to the grey block detection module for determining the compression ratio of the input image block, a mode setting module within the mode determination module and coupled to the compression ratio module for setting a PCM mode identifier based on the compression ratio of the input image block meeting or exceeding a compression ratio threshold, the coding module for generating a compressed image block by scanning and coding the bitplanes of the input image block using PCM mode; and a decoding module coupled to the coding module for generating an output image block by decoding the compressed image block for display on a display device.

Certain embodiments of the invention have other steps or elements in addition to or in place of those mentioned above. The steps or element will become apparent to those skilled in the art from a reading of the following detailed description when taken with reference to the accompanying drawings.

BRIEF DESCRIPTION OF THE DRAWINGS

FIG. 5 is an example of the bitplanes of the wavelet coefficients of FIGS. 2 and 3.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "module" referred to herein can include software, hardware, or a combination thereof in the present invention in accordance with the context in which the term is used. For example, the software can be machine code, firmware, embedded code, and application software. Also for example, the hardware can be circuitry, dedicated circuitry for a specific function, a processor, a computer, an integrated circuit, integrated circuit cores, a microelectromechanical system (MEMS), passive devices, environmental sensors including temperature sensors, or a combination thereof.

Figure 1:
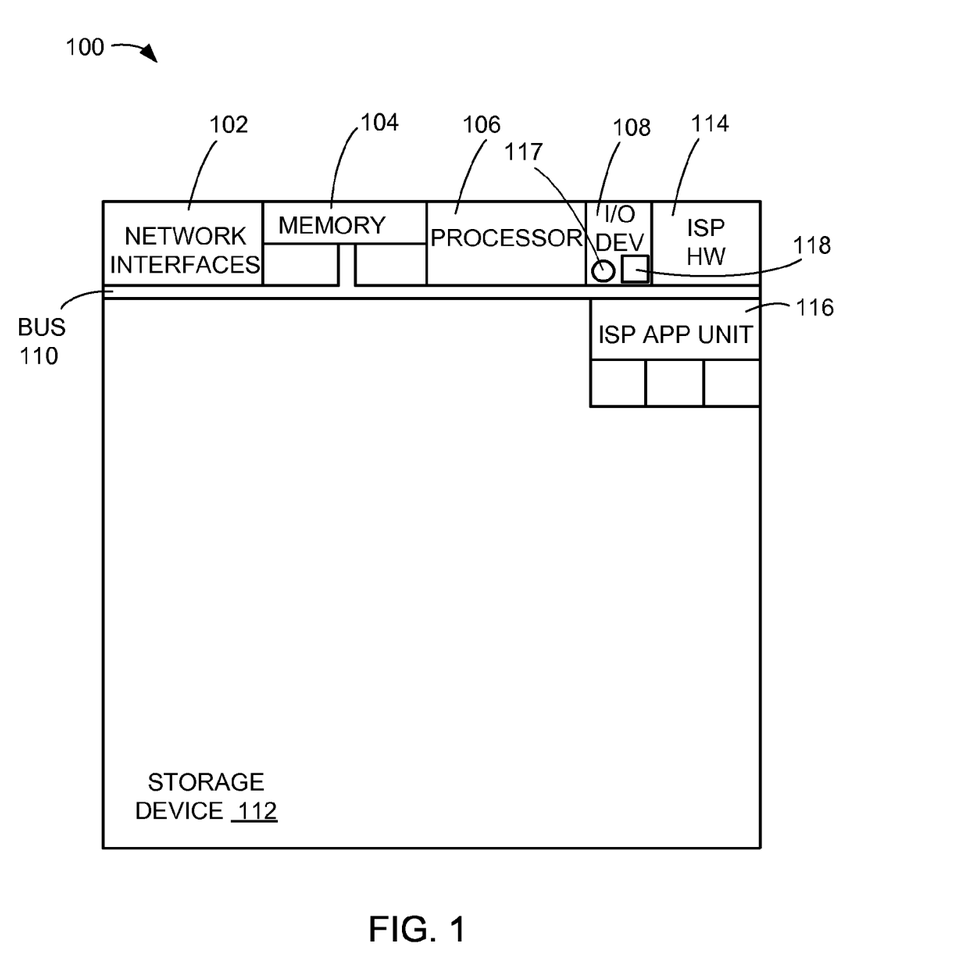
FIG. 1 is an example of a block diagram of an image processing system with coding modes in a first embodiment of the present invention.

Referring now to FIG. 1, therein is shown an example of a block diagram of an image processing system 100 with coding modes in a first embodiment of the present invention. The image processing system 100 can be used to acquire, store, compute, communicate, and display information including images and videos.

The image processing system 100 can include a hardware structure implemented with any number of hardware units including network interfaces 102, a memory 104, a processor 106, input/output devices 108, a bus 110, and a storage device 112. An example of the network interfaces 102 can include a network card connected to an Ethernet or other types of local area networks (LAN). As a specific example, the LAN can include Bluetooth, Near Field Communication (NFC), wireless LAN, Long-Term Evolution (LTE), third Generation (3G), and Enhanced Data rates for GSM Evolution (EDGE).

The memory 104 can include any computer memory types. The processor 106 can include any processing unit with sufficient speed chosen for data control and computation operations of the hardware units in the image processing system 100.

The input/output devices 108 can include one or more input/output units including a keyboard, a mouse, a monitor, a display, a printer, a modem, a touchscreen, a button interface, and any other input/output units. The storage device 112 can include any storage units including a hard drive, a compact disc read-only memory (CDROM), a compact disc rewritable (CDRW), a digital video disc (DVD), a digital video disc rewritable (DVDRW), and solid state or flash memory. The storage device 112 and the memory 104 and can be used to store data for processed by any of the units in the image processing system 100.

The image processing system 100 can include functions for image processing of the images and the videos. The image processing functions can be implemented with hardware, software, or any combination thereof. The image processing system 100 can include an image signal processing hardware 114 and an image signal processing application unit 116.

The image signal processing hardware 114 can include any hardware units for processing images including dedicated circuitry, a processor, an integrated circuit, and integrated circuit cores. The image signal processing application unit 116 can include software including machine code, firmware, embedded code, or application software.

The image processing system 100 can represent or can be implemented in computing devices. For example, the computing devices can include a personal computer, a laptop computer, a computer workstation, a server, a mainframe computer, a handheld computer, a personal digital assistant, a cellular/mobile telephone, a smart appliance, and a gaming console.

Also for example, the computing devices can include a cellular phone, a digital camera, a digital camcorder, a camera phone, a music player, a multimedia player, a video player, a DVD writer/player, a television, a home entertainment system, or any other computing devices. As a specific example, the computing devices can include Cyber-shot® cameras, CMOS sensor Digital Still Cameras (DSC), Handycam camcorders, and single-lens reflex (SLR) cameras. As another specific example, the computing devices can include Point-and-shoot cameras, video camcorders, single-lens reflex (SLR) cameras, mirrorless cameras, and cameras in mobile devices.

The input/output devices 108 can include a capture device 117. For example, the capture device 117 can be used to capture video. The input/output devices 108 can also include display devices 118 to display image information. The display devices 118 are units that present visual representations of images or any visual information. The display devices 118 can utilize a variety of display technologies such as LCD, LED-LCD, plasma, holographic, OLED, front and rear projection, CRT, or other display technologies.

The video captured by the capture device 117 can be considered as a series of images which can further be broken down into input image blocks, for example. The capture device 117 is shown as connected to the processor 106 and the image signal processing hardware 114, but it is understood that the capture device 117 can be separate from the processor 106. In addition, the processor 106 can be physically separate from the display devices 118. The capture device 117, the processor 106, and the display devices 118 can all be connected physically or wirelessly, through the network interfaces 102, for example, as required by usage patterns. For example, the capture device 117 can be a video camera capable of a wired or wireless connection to a display device having the processor 106 and the display devices 118. As another example, the capture device 117 and certain subunits of the image signal processing hardware 114 can be contained within a camera capable of wired or wireless connection to a display device having the remaining subunits of the image signal processing hardware 114 and the display devices 118 which can display resulting video.

Regardless of how the capture device 117, the processor 106, and the display devices 118 are connected, the display devices 118 can output decoded image blocks as decoded video after processing of the input image blocks by the image signal processing hardware 114. The quality of the resulting video can be determined by the particular compression scheme used when transmitting image block data, for example.

Figure 2:
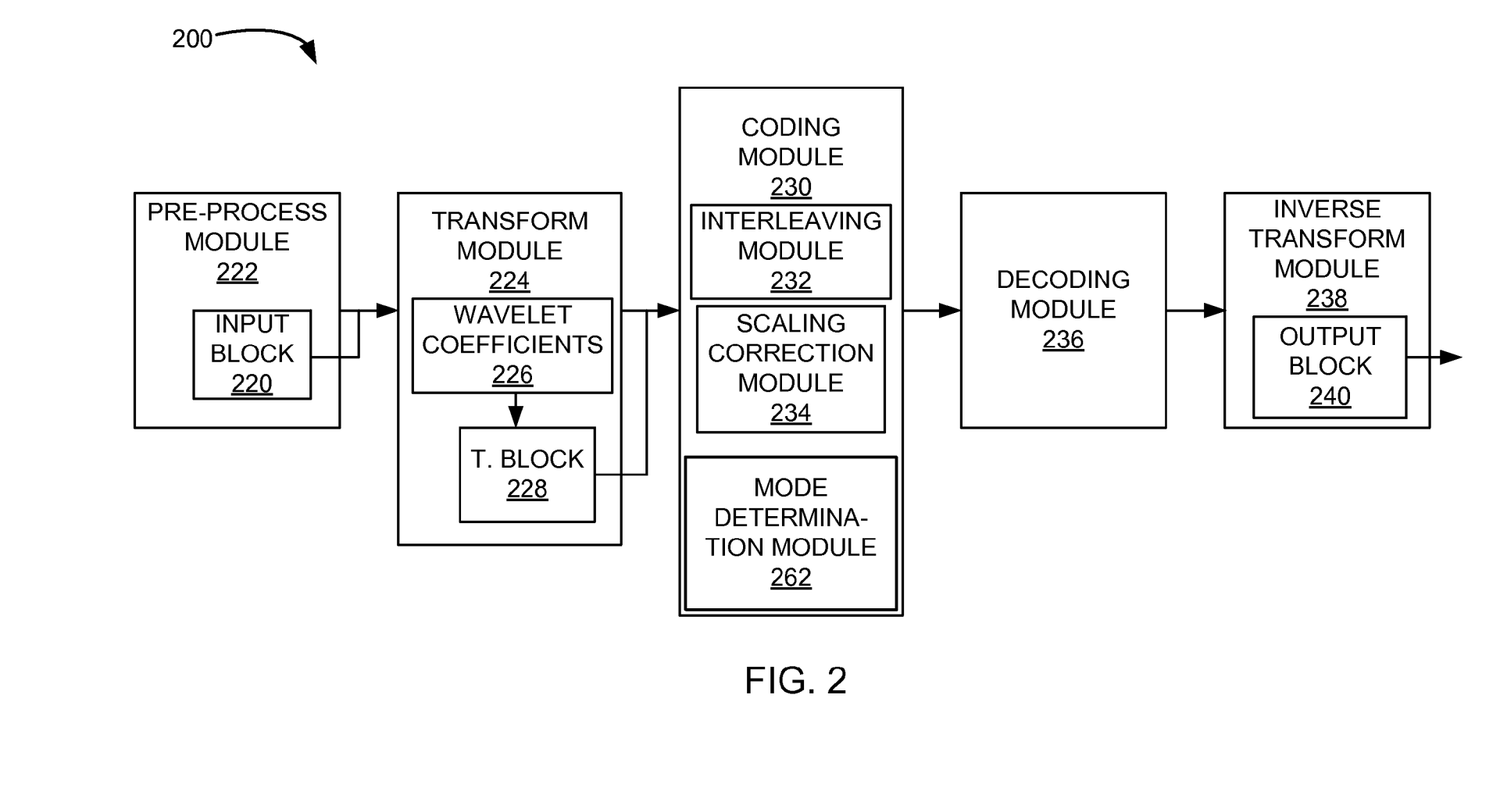
FIG. 2 is a system diagram of the image processing system in a second embodiment of the present invention.

Referring now to FIG. 2, therein is shown a system diagram of the image processing system 200 in a second embodiment of the present invention. In this embodiment, images or video are handled at the level of image blocks, which are selected portions of the images or video. An input image block 220 is generated from image information captured by the capture device 117 of FIG. 1. For example, the input image block 220 can be generated by taking a set number of pixels from the captured image information at regular intervals to cover all portions of the image information.

In this example, processing of the input image block 220 takes place in the image signal processing hardware 114 and in various processing subunits of the image signal processing hardware 114. For example, the processing subunits or modules which perform specific functions can be hardware subunits, dedicated circuitry, or modules within the image signal processing hardware 114.

A pre-processing module 222 can generate the input image block 220 where the pixels of the input image block 220 are assigned numbers and arranged in order in what is sometimes called a one-dimensional image block. The one-dimensional image block will be described in greater detail in later figures. For example, the one-dimensional image block can be formed from 32 or 64 pixels. The color components of the pixels can be used to create separate but related instances of the input image block 220. For example, in a YUV 422 formatted image, separate image blocks can contain data for the Y (or luma) channel, the U channel, or V channel (U and V are also considered the chroma channels). The input image block 220 can contain data from one or more of the channels; for example, the input image block 220 can contain only Y channel information. The pre-processing module 222 allows for easier and faster processing in later steps.

The pre-processing module 222 is coupled to a wavelet transform module 224, which transforms the visual data in the pixels of the input image block 220 after removing an offset, for example, into wavelet coefficients 226 which can be used to create a transformed image block 228. In order to have the transformation be reversible, integer wavelet coefficients can be used, for example. As a more specific example, Daubechies 5/3 integer wavelets can be used. It has been found that this allows for visually lossless compression and for the ability to perform simple integer-based calculations, which simplifies calculations and allows for a reduction in hardware cost. The wavelet transform module 224 can also perform a decomposition step to generate various high pass and low pass bands and subbands within the ordered list of the wavelet coefficients 226. An example of the transformed image block 228 can be seen in FIG. 4.

The wavelet transform module 224 is coupled to a coding module 230, which can also be considered as a compression module. The coding module 230 can act on the wavelet coefficients 226. The coding module 230 can contain submodules including an interleaving module 232 and a scaling correction module 234. In situations where sampling of color component values is done on an unequal basis, it has been found to be helpful to interleave smaller blocks to equal the size of larger blocks. For example, in YUV 422 images, Y values are sampled twice as often as U and V values; this means that there will be twice as many of the wavelet coefficients 226 for Y as for U or V individually. Thus, the interleaving module 232 can interleave the wavelet coefficients from U and V image blocks in order to generate a transformed and interleaved image block with combined U and V information that is the same size as the transformed image block 228 which contains Y information, for example.

The values of each of the wavelet coefficients 226 can be expressed as binary values, or bits. The bits can be organized into an array with the most significant bits at the top of the array, with less significant bits listed in decreasing priority when going down the array. The array can be subdivided into bitplanes of various significance, with the most significant of the bitplanes at the top of the array. An example of the bitplanes of the wavelet coefficients 226 can be seen in FIG. 5.

The scaling correction module 234 can adjust priorities of the various subbands of the wavelet coefficients 226 within the transformed image block 228 in order to ensure proper scaling of the wavelet coefficients 226. This can have the effect of creating scaled bitplanes which can create higher priority bitplanes than previously existed. This can also generate a scaled wavelet block.

The coding module 230 can also contain a mode determination module 262, which can determine whether wavelet coding or PCM (pulse-code modulation) coding makes more sense. The mode determination module 262 can contain many submodules, described in greater detail in FIG. 3.

The coding module 230 can be coupled to a decoding module 236, which reverses the operations of the coding module 230 to decompress a compressed image block (the data) sent from the coding module 230 to the decoding module 236. An inverse wavelet transform module 238 can reverse the operations of the wavelet transform module 224 and generate an output image block 240 if the default wavelet mode was selected. The output image block 240 can then be displayed on the display devices 118 of FIG. 1. Post processing can be done on the output image block 240 before display as necessary, for example.

Figure 3:
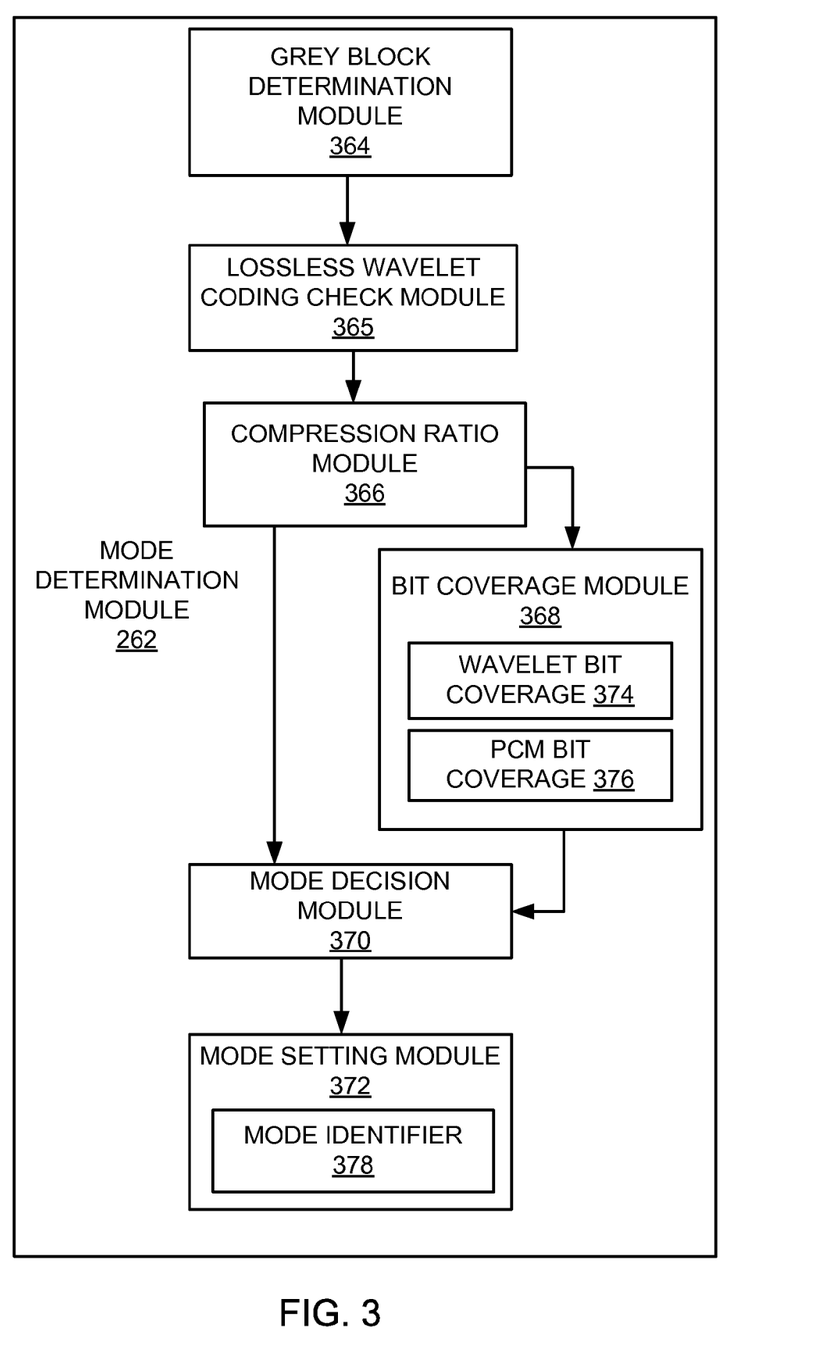
FIG. 3 is a detailed view of the mode determination module.

Referring now to FIG. 3, therein is shown a detailed view of the mode determination module 262. The mode determination module 262 can contain various submodules including a grey block determination module 364, a lossless wavelet coding checking module 365, a compression ratio module 366 coupled to the grey block determination module 364, a bit coverage module 368 coupled to the compression ratio module 366, a mode decision module 370 coupled to the bit coverage module 368 and the compression ratio module 366, and a mode setting module 372 coupled to the mode decision module 370.

The grey block determination module 364 acts before coding actually begins, and performs a check for grey image blocks. This type of image block is sometimes called a black and white image block. An image block is considered to be a grey block under specific conditions. For example, if the image block is a YUV (more precisely called YCbCr) block, the block is considered to be grey if the U and V components are 0 within an offset. For a more specific example, if the input image is a 10-bit image, if the U and V values equal 512, such a block is considered a grey block because the offset is 512. If the block is not considered a grey block, the mode decision module 370 selects default scanning and wavelet coding. If the image block is found to be a grey block, a flag is added to indicate that a check should be performed to compare PCM coding mode against the wavelet coding mode (the default mode in this example) only if wavelet coding mode results in a lossy bitstream. The latter condition is checked at the lossless wavelet coding check module 365 after coding of the wavelet coefficients and storing a temporary wavelet bitstream in a buffer. The lossless wavelet coding check module checks if all bits of bitplanes of the wavelet coefficients in the block (For example, please see FIG. 7) are coded in the bitstream before the size of the bitstream reaches the bitbudget limit. If the block could be coded losslessly by the wavelet mode, then wavelet mode is selected by the mode selection module 370 and the temporary wavelet bitstream stored in the buffer is used as the final bitstream. If the wavelet coding of the grey block is found to be lossy (that is, that the bitbudget limit is hit before all bits are coded) by the lossless wavelet coding check module 365, then this block is marked as a temporary wavelet bitstream, or in other words, a candidate for the PCM mode that will be checked in the following modules.

It has been discovered that the check for grey image blocks by the grey block determination module 364 enables the better compression of the Y channel of a YUV image block. Because a grey image block has U and V values set at 0 within an offset, there is no need to use any of the bitbudget to code the U and V values. This allows the entire bitbudget for a given image block to be used for the Y values, which also allows for the possibility of using PCM coding, which provides better quality at higher bitrates. The higher bitrate is possible because the grey image block has been found and the entire bitbudget, which is normally spread out among the Y, U, and V channels separately, is available to the Y channel. This provides a great amount of flexibility in how coding is approached, and provides for better overall compression and quality.

The compression ratio module 366 can perform a first check in the decision whether to use PCM coding or wavelet coding. The compression ratio module 366 checks if the compression ratio (for example, rate/bitdepth) is greater than a compression ratio threshold for an input image format such as YUV 422. If this condition is satisfied, then it flags the mode decision module 370 to select the PCM mode; otherwise, the decision to select the PCM mode or the wavelet mode depends on the bitcoverage module 368 outcome.

For clarity, the following example is provided. First, the image block is a YUV 422 block that has been determined to be grey (a value of 0 within an offset) for chroma (U and V) components of the image block. Second, the wavelet encoder has resulted in a lossy compression of this grey block which is of a size N×1 with a particular bitdepth. With these example conditions, the compression ratio module performs a check to see if the compression ratio (expressed as a percentage or in decimal form if calculated with rate/bitdepth) is greater than or equal to 45%. That is, if the compression ratio has met or exceeded the compression ratio threshold, for example. If the compression ratio threshold is met or exceeded, PCM mode can be selected by the mode setting module 372.

If the compression ratio threshold is not met or exceeded, then a second condition can be checked by the bit coverage module 368. The bit coverage module 368 can calculate both the bit coverage of wavelet coding and the bit coverage of PCM coding. The bit coverage can be calculated using Equation 1 for wavelet coding bit coverage and Equation 2 for PCM coding bit coverage, for example. Equation 1 and Equation 2 are used for YUV 422 image blocks.

$$\text{Cover}W = N(W_m - V + \text{bitdepth}) \quad \text{Equation 1:}$$

$$\text{Cover}PCM = 2N \times \text{rate} - 2 \quad \text{Equation 2:}$$

In the above example equations, the variables can represent different parameters. The equations are for example only. CoverW represents a wavelet coding bit coverage 374. If block size is 32×1, N would equal 32, for example. N is the block size where the image block is a one-dimensional image block. $W_m$ stands for the bitplane number (also considered as the bitplane priority value) of the most significant bitplane before any scaling. V stands for the bitplane number where the coder stops and exits coding. The subtraction of 2 bits can be to allow for signaling PCM coding via the first two bits of a header region, for example. CoverPCM stands for a PCM coding bit coverage 376.

The mode decision module 370 then compares the wavelet coding bit coverage 374 (CoverW) and the PCM coding bit coverage 376 (CoverPCM). If CoverPCM>CoverW, then PCM mode for coding is chosen. That is, if the PCM coding has better bit coverage than wavelet coding, PCM coding is chosen or selected by the mode decision module 370.

As another example, if the image blocks are YUV 444 image blocks, and all previous conditions have been met, a first check can be performed to check if the compression ratio is greater than or equal to 40%. If the compression ratio threshold (in this example, 40%) has been met or exceeded, this information is passed to the mode decision module 370, which can select PCM coding.

If the compression ratio threshold is not met or exceeded, then a second condition can be checked by the bit coverage module 368. The bit coverage module 368 can calculate both the bit coverage of wavelet coding and the bit coverage of PCM coding. Equation 3 and Equation 4 are used to calculate bit coverage in this example.

$$CoverW = N(W_m - V + 2 \times bitdepth) \quad \text{Equation 3:}$$

$$CoverPCM = 3N \times rate - 3 \quad \text{Equation 4:}$$

All variables represent the same parameters as in Equations 1 and 2. The bit coverage for wavelet coding and PCM coding can be calculated by the bit coverage module 368. Again, the mode decision module 370 can compare the wavelet coding bit coverage 374 (CoverW) and the PCM coding bit coverage 376 (CoverPCM). If CoverPCM>CoverW, then PCM coding can be chosen or selected by the mode decision module 370.

If PCM coding is chosen, the mode setting module 372 can set a PCM mode identifier 378 or a flag to signal that PCM mode was used in a given image block. Then the buffer that stored the temporary wavelet bitstream can be cleared and the input image block 220 which was originally used can be used in PCM coding to form a PCM bitstream within the bitbudget limit. The PCM mode identifier 378 is necessary so that the decoding module 236 of FIG. 2 can properly engage the right decoding method (in this example, the PCM mode) and decompress the image block. For example, the PCM mode identifier 378 can be the first two bits of the bitstream of each image block. As a more specific example, the first two bits of the header can be set to [11] as opposed to a default value of [10]. It is understood that any signaling method may be used as the PCM mode identifier 378 so long as it is consistently applied and easily recognizable.

It has been discovered that the use of PCM mode in certain situations, as detailed above, produces better overall compression for an image block, which leads to lower bandwidth requirements and lower error. When PCM coding has better bit coverage than wavelet coding, for example, less information is lost to compression. Furthermore, it is understood that if wavelet coding has a low enough bitbudget, errors can be introduced by compression whereas with the same bitbudget, PCM coding might have lower error overall. In addition, the PCM mode in certain situations can also allow for the use of a lower bitrate or bitbudget which reduces the memory or bus bandwidth required for a given level of video quality.

It has also been discovered that the use of PCM mode allows for faster decompression. Decompression or decoding of PCM coded information is computationally less demanding than decompressing wavelet coded information. The cheaper computational resource requirements of PCM coded data allow for lower power and cheaper hardware on the decoder side, which can lower overall device costs while also maximizing quality. Because PCM mode is only used (as shown above) in situations where wavelet coding would be less efficient, the check for compression ratios or respective bit coverage can lead to higher quality decoded blocks or output blocks as each image block is evaluated separately. This improves the efficiency of wavelet-based bitplane coding schemes for YUV blocks.

Figure 4:
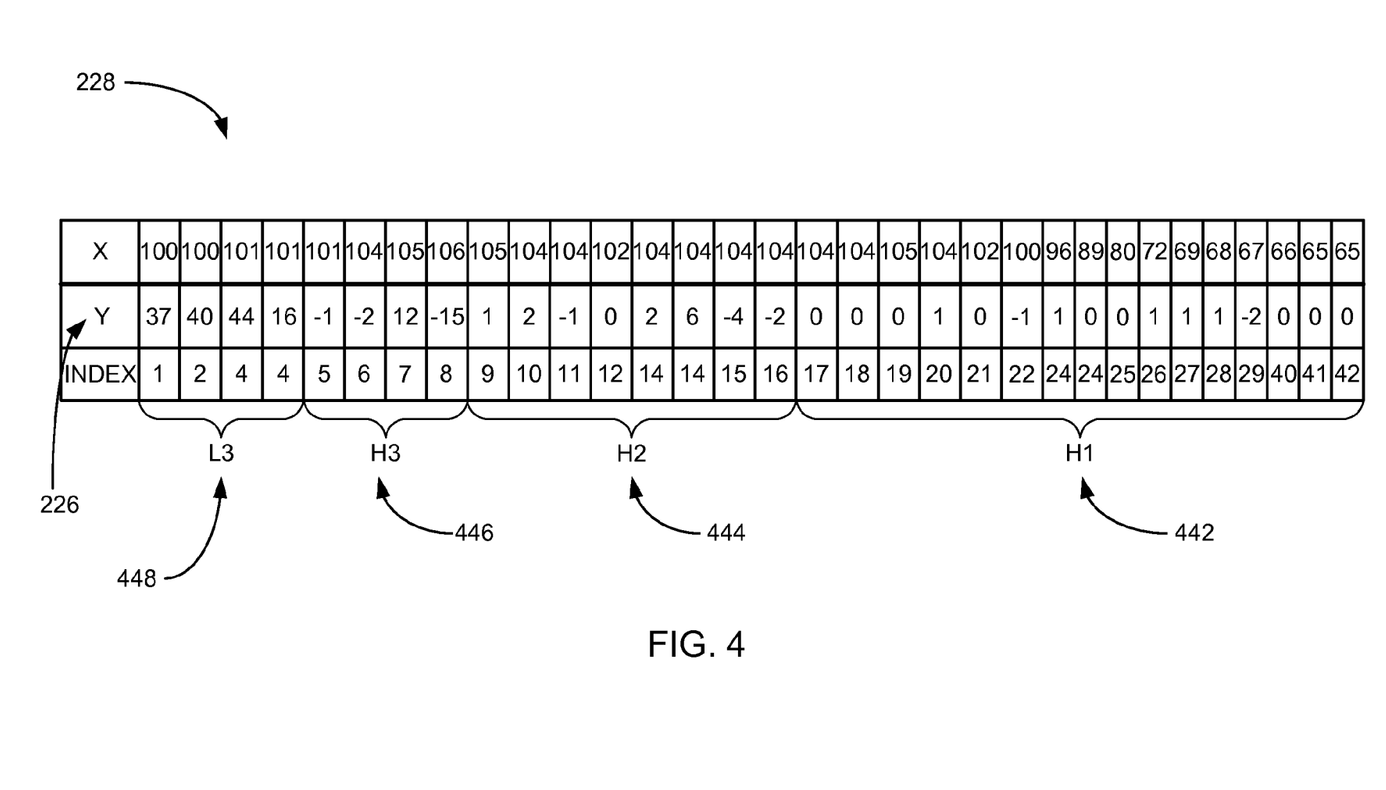
FIG. 4 is an example of the transformed image block of FIG. 2.

Referring now to FIG. 4, therein is shown an example of the transformed image block 228 of FIG. 2. It is understood that the numbers are for illustrative purposes only, and that parameters of the transformed image block 228 can be modified. For example, while the block size of the transformed image block 228 shown is 32×1 (nominally pixels), it is understood that the block size can be different such as 64×1 or other size as required by the situation.

In this example, the transformed image block 228 is the luma, or Y component of the visual data. The letter x denotes the intensity value of each pixel within a 0-255 scale, as an example. The letter y designates the wavelet coefficients 226 as determined by the wavelet transform module 224 of FIG. 2. In this example, integer wavelet coefficients are used so a reverse transform is possible. The index number is a way of tracking the wavelet coefficients 226.

Also shown in this figure are the results of cascading signal decomposition. A level one high pass subband 442 is the result of the first decomposition, and is noted by H1. A level two high pass subband 444 is the result of a second decomposition step, and is noted by H2. A level three high pass subband 446 is the result of a third decomposition, and is noted by H3. A level three low pass subband 448 is noted by L3, and is the same size as the level three high pass subband 446 as well as being a result of the third decomposition. The particular decomposition pattern is for example only, and it is understood that other types of signal decomposition are possible.

Referring now to FIG. 5, therein is shown an example of the bitplanes of the wavelet coefficients 226 of FIGS. 2 and 3. This can be considered as an expanded view of the transformed image block 228, which is the input image block 220 of FIG. 2 after going through the wavelet transform module 224 of FIG. 2. As with FIG. 4, the values are for example only. In this example, the index numbers and the wavelet coefficients 226 are shown above bitplanes 550 of the wavelet coefficients 226. The bitplanes 550 are defined as the horizontal rows of bits which represent a portion of the value of the wavelet coefficients 226. In this example, below each of the wavelet coefficients 226 is the binary representation of the value of the wavelet coefficients 226, read from the top to the bottom; for example, the binary value below the wavelet coefficient of 37 corresponding to index number 1 can be read as 100101, which is the binary representation of the number 37.

The n value is a bitplane priority value 552, with lower numbers having lower priority. For example, a most significant bitplane 554 will have the highest value for the bitplane priority value 552; in this example, the most significant bitplane 554 is the horizontal row of bits with the bitplane priority value 552 of 6 (shown as n=6). In this example, this is because 6 bits are necessary to cover all of the existing wavelet coefficient values; it is understood that the number of the bitplanes 550 can change depending on the maximum value within of the wavelet coefficients 226.

Figure 6:
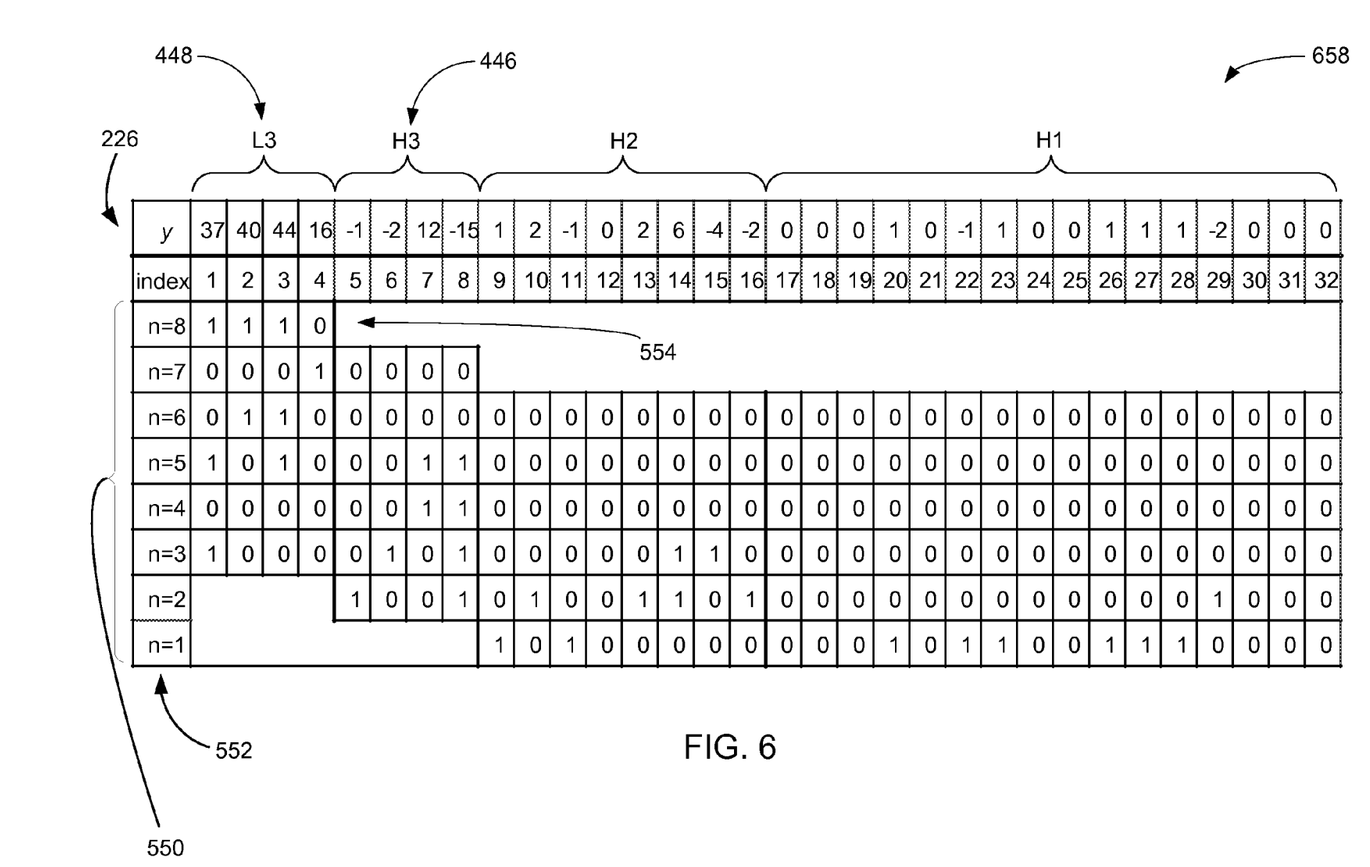
FIG. 6 is an example of the scaled bitplanes of the wavelet coefficients of FIG. 4.

Referring now to FIG. 6, therein is shown an example of the scaled bitplanes of the wavelet coefficients 226. This example shows scaling of the bitplanes 550 of the wavelet coefficients 226 of the Y or luma component of the input image block of FIG. 2.

In a regular scan of the bitplanes 550 (which could be performed, for example, on the bitplanes 550 seen in FIG. 5), the scan for compression purposes will start from the first bit (generally index number 1) of the most significant bitplane 554 and scan in order across the most significant bitplane 554 (before scaling, this would have been n=6). Once the end of the most significant bitplane 554 is reached, the scan continues from the first bit of the next bitplane having the bitplane priority value 552 which is one less than that of the most significant bitplane 554. This pattern continues until all bits have been scanned or until the bitbudget is reached.

The scaling of the bitplanes 550 can be performed by the scaling correction module 234 of FIG. 2 which can then output a scaled wavelet block 658 for scanning and coding in the coding module 230 of FIG. 2.

When using wavelet coefficients, normal scaling results in non-integer values. In order to have reversible wavelet compression, integer-based wavelets are required. This results in the use of a scaling factor of 1 rather than typical scaling factors; for example, low pass wavelet coefficients can be scaled by the square root of 2, and high pass coefficients could be scaled by 1 over the square root of 2. To have integer-based (reversible) wavelets, the scaling factor of 1 will be used for all of the wavelet coefficients 226.

However, when the scaling factor is changed, the quality of the image blocks after decompression is decreased. For example, the peak signal-to-noise ratio (PSNR) can indicate a decrease in quality. One solution to this problem is to modify scaling of particular wavelet subbands. For example, the wavelet coefficients 226 in the level three low pass subband 448 can be multiplied by 4, and the wavelet coefficients 226 in the level three high pass subband 446 can be multiplied by 2. The result of this multiplication is to "shift" the binary values in the level three low pass subband 448 and the level three high pass subband 446 up by two bitplanes and one bitplane, respectively, as can be seen in the figure. This increases the bitplane priority value 552 (shown as n=<a number>) of the most significant bitplane 554 (represented in this example as n=8 which becomes the most significant bitplane 554 after scaling) to 8, from a previous value of 6, which can be seen in FIG. 5. This can complete the generation of the scaled wavelet block 658.

Due to the increase in the bitplane priority value 552 for the level three low pass subband 448 and the level three high pass subband 446, the scan order when performing coding or compression is modified as can be seen in the figure. For example, because all bitplanes of the level three low pass subband 448 have had the bitplane priority value 552 increased by two bitplanes, the bits of the wavelet coefficients 226 of the level three low pass subband 448 will be scanned earlier than otherwise. It is important to note that because only some of the wavelet subbands have been shifted, the bitplane priority value 552 may only have one or two subbands rather than all of them. In this example, when the bitplane priority value=8, there are only the bits of the most significant bitplane 554 of the wavelet coefficients 226 in the level three low pass subband 448.

It has been discovered that increasing the bitplane priority value 552 of selected wavelet subbands largely restores preferred scaling. Because replacing standard scaling factors with a scaling factor of 1 reduces quality due to improper scaling of the wavelet coefficients 226, increasing the bitplane priority value 552 of certain wavelet subbands such as the level three low pass subband 448 and the level three high pass subband 446 can allow for the adjusted scan order to more closely match the scan order one would see in a preferred scaling scheme.

Figure 7:
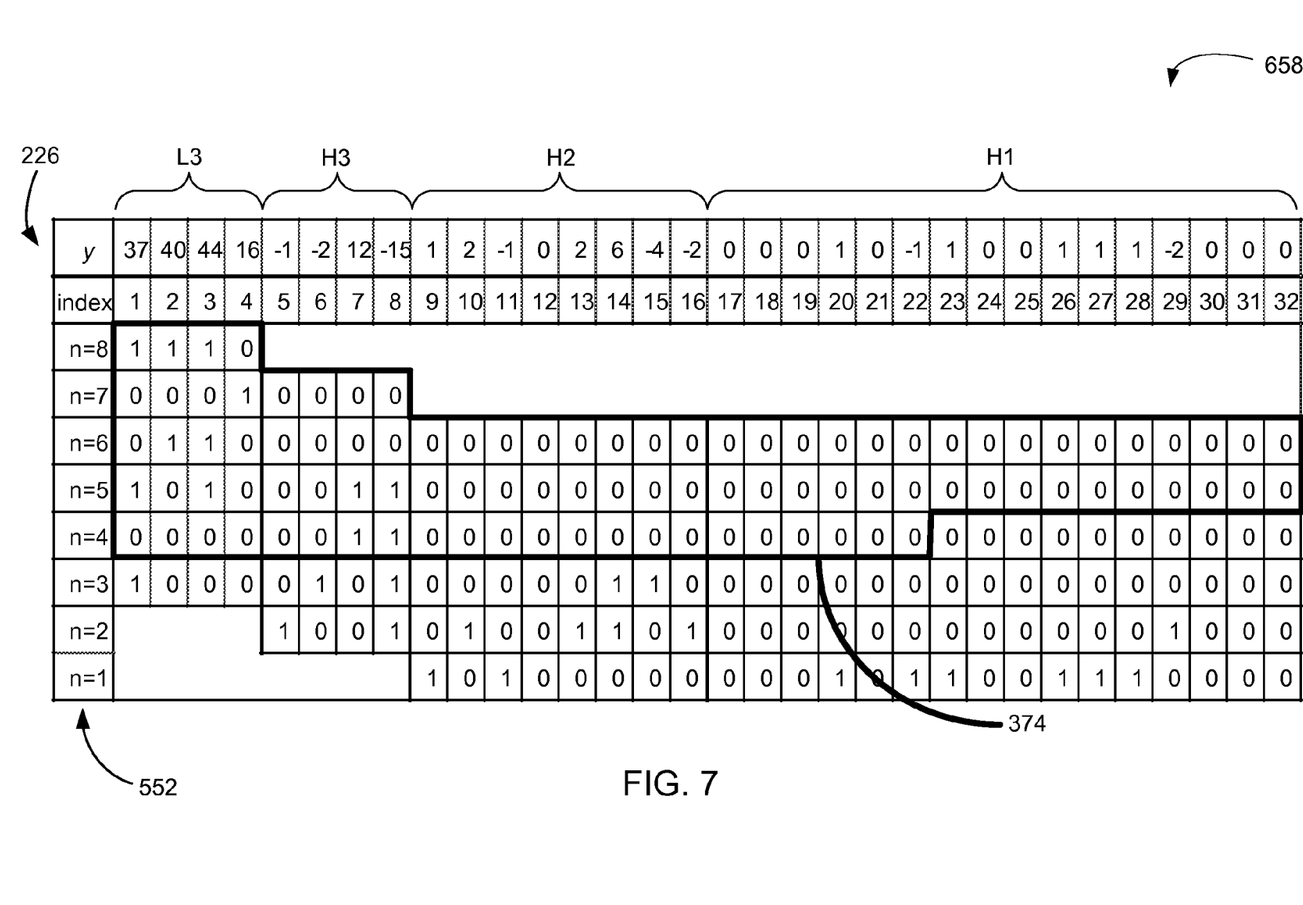
FIG. 7 is an example of the wavelet coding bit coverage of the scaled wavelet block.

Referring now to FIG. 7, therein is shown an example of the wavelet coding bit coverage of the scaled wavelet block 658. In this example, scanning of the bits of the wavelet coefficients 226 of the scaled wavelet block 658 has hit the bitbudget and has stopped. The wavelet coding bit coverage 374 of the scan is indicated by the heavier lines, which outline the bits covered by the scan.

The wavelet coding bit coverage 374 shown is for example only, as are all numbers used. In this example, the scaled wavelet block 658 is a YUV 422 luma image block, so Equation 1 is used to calculate the wavelet coding bit coverage 374 (CoverW). As can be seen in this figure, V is 4 because the bitbudget ran out on the bitplane priority value 552 of n=4. This is a 32×1 image block, so N=32. $W_m$ is the most significant bitplane before scaling, which is n=6. In this example, the bitdepth is provided as 8 bits. Using these values for Equation 1 means we have CoverW=32(6−4+8) =320. The wavelet coding bit coverage 374 in this example is 320. This value is compared with the PCM coding bit coverage 376 of FIG. 3 (in this example, calculated with Equation 2) to see if PCM coding should be used rather than wavelet-based coding. The details of this comparison are discussed in the description of FIG. 3.

Figure 8:
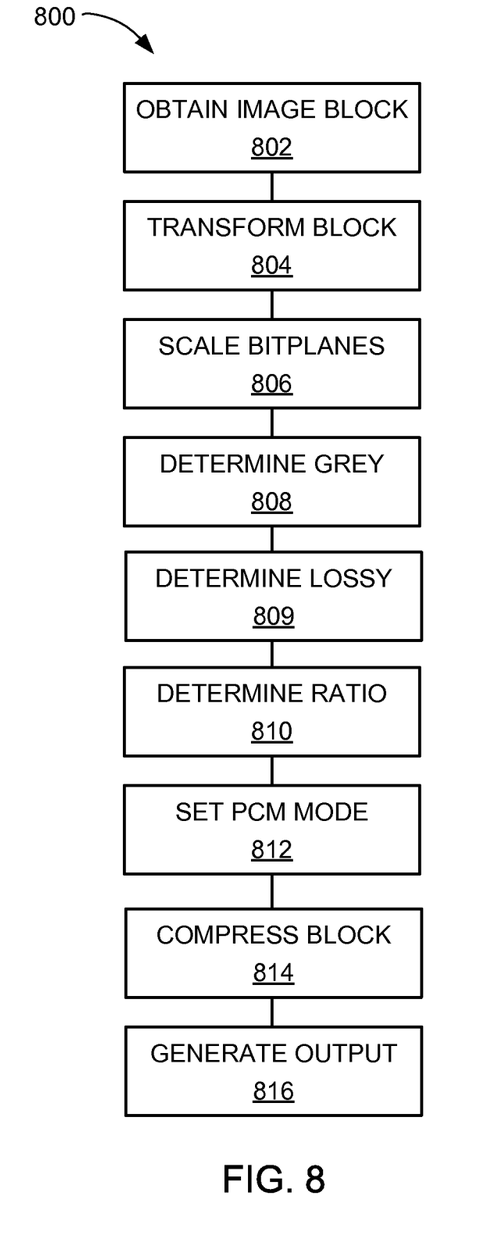
FIG. 8 is a flow chart of a method of operation of an image processing system in a further embodiment of the present invention.

Referring now to FIG. 8, therein is shown a flow chart of a method 800 of operation of an image processing system in a further embodiment of the present invention. The method 800 includes: obtaining an input image block with a capture device in a block 802; generating a transformed image block based on the input image block, the transformed image block having wavelet coefficients where the binary values of the wavelet coefficients are organized into bitplanes each with a bitplane priority value in a block 804; generating a scaled wavelet block by increasing the bitplane priority value for selected subbands of the bitplanes of the wavelet coefficients with a scaling factor in a block 806; determining the input image block to be a grey image block in a block 808; determining wavelet coding of the scaled wavelet block to result in lossy compression in a block 809; determining the compression ratio of the input image block in a block 810; setting a PCM mode identifier based on the compression ratio of the input image block meeting or exceeding a compression ratio threshold in a block 812; generating a compressed image block by scanning and coding the bitplanes of the input image block using PCM mode in a block 814; and generating an output image block by decoding the compressed image block for display on a display device in a block 816.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. An image processing system comprising:
a capture device for obtaining an input image block; and
an image signal processing hardware coupled to the capture device, the image signal processing hardware including:
  a wavelet transform module for generating a transformed image block based on the input image block, the transformed image block having wavelet coefficients where the binary values of the wavelet coefficients are organized into bitplanes each with a bitplane priority value,
a coding module coupled to the wavelet transform module including:
  a scaling correction module for generating a scaled wavelet block by increasing the bitplane priority value for selected subbands of the bitplanes of the wavelet coefficients with a scaling factor,
  a grey block detection module within a mode determination module for determining the input image block to be a grey image block,
  a lossless wavelet coding check module for determining wavelet coding of the scaled wavelet block to result in lossy compression,
  a compression ratio module within the mode determination module and coupled to the grey block detection module for determining the compression ratio of the input image block,
  a mode setting module within the mode determination module and coupled to the compression ratio module for setting a PCM mode identifier based on the compression ratio of the input image block meeting or exceeding a compression ratio threshold, the coding module for generating a compressed image block by scanning and coding the bitplanes of the input image block using PCM mode; and
  a decoding module coupled to the coding module for generating an output image block by decoding the compressed image block for display on a display device.

2. The system as claimed in claim 1 wherein:
the compression ratio module is for determining the compression ratio as less than the compression ratio threshold;
further comprising:
  a bit coverage module coupled to the compression ratio module for determining a wavelet coding bit coverage and determining a PCM coding bit coverage; and
  a mode decision module coupled to the compression ratio module and the bit coverage module for comparing the wavelet coding bit coverage with the PCM coding bit coverage.

3. The system as claimed in claim 1 wherein the grey block detection module is for determining U and V values of a YUV image block to be 0 within an offset.

4. The system as claimed in claim 1 wherein the coding module is for:
generating a temporary wavelet bitstream; and
generating a PCM bitstream.

5. The system as claimed in claim 1 wherein the compression ratio module is for setting the compression ratio threshold at 40% for a YUV 444 image block.

6. The system as claimed in claim 1 further comprising:
a bit coverage module coupled to the compression ratio module for determining a wavelet coding bit coverage and determining a PCM coding bit coverage;
a mode decision module coupled to the compression ratio module and the bit coverage module for comparing the wavelet coding bit coverage with the PCM coding bit coverage;
wherein:
  the compression ratio module is for determining the compression ratio as less than the compression ratio threshold;
  the coding module is for generating a temporary wavelet bitstream and generating a PCM bitstream; and
  the mode setting module is for setting the PCM mode identifier based on the wavelet coding bit coverage as less than the PCM coding bit coverage.

7. The system as claimed in claim 6 wherein the compression ratio module is for setting the compression ratio threshold at 45% for a YUV 422 image block.

8. The system as claimed in claim 6 further comprising a pre-processing module coupled to the wavelet transform module for:
partitioning a set number of pixels from image information; and
organizing the pixels into a one-dimensional image block.

9. The system as claimed in claim 6 wherein the wavelet transform module is for using an integer-based wavelet transform on the input image block.

10. The system as claimed in claim 6 wherein the mode setting module is for using 2 bits in a header region to signal PCM mode.

* * * * *

UNITED STATES PATENT AND TRADEMARK OFFICE
CERTIFICATE OF CORRECTION

PATENT NO.        : 9,674,554 B2
APPLICATION NO.   : 14/525556
DATED             : June 6, 2017
INVENTOR(S)       : Ramin Eslami It is certified that error appears in the above-identified patent and that said Letters Patent is hereby corrected as shown below:

Column 9 at Line 19; the equation 4 "CoverPCM=3N×rate - 3" should read
-- CoverPCM=3N×rate - 2 --.

Signed and Sealed this
Third Day of October, 2017

Joseph Matal
*Performing the Functions and Duties of the*
*Under Secretary of Commerce for Intellectual Property and*
*Director of the United States Patent and Trademark Office*